(12) United States Patent
Haas

(10) Patent No.: US 9,107,504 B2
(45) Date of Patent: Aug. 18, 2015

(54) RECLINING LOOP FRAME STACKING / SWIVEL CHAIR

(71) Applicant: Peter J. Haas, New York, NY (US)

(72) Inventor: Peter J. Haas, New York, NY (US)

( * ) Notice: Subject to any disclaimer, the term of this patent is extended or adjusted under 35 U.S.C. 154(b) by 9 days.

(21) Appl. No.: 13/894,030

(22) Filed: May 14, 2013

(65) Prior Publication Data

US 2013/0300079 A1  Nov. 14, 2013

Related U.S. Application Data

(60) Provisional application No. 61/688,449, filed on May 14, 2012.

(51) Int. Cl.
| | |
|---|---|
| *A47C 1/023* | (2006.01) |
| *A47C 3/04* | (2006.01) |
| *B62B 3/00* | (2006.01) |
| *A47C 3/021* | (2006.01) |
| *A47C 7/44* | (2006.01) |

(52) U.S. Cl.
CPC ................. *A47C 1/023* (2013.01); *A47C 3/021* (2013.01); *A47C 3/04* (2013.01); *A47C 7/44* (2013.01); *B62B 3/00* (2013.01)

(58) Field of Classification Search
CPC ............. A47C 3/04; A47C 1/023; B62B 3/00
USPC ........................ 280/79.2; 297/313, 239, 354.1
See application file for complete search history.

(56) References Cited

U.S. PATENT DOCUMENTS

| D101,567 | S |   | 10/1936 | Vavrik | |
|---|---|---|---|---|---|
| 2,554,490 | A | * | 5/1951 | Eames | ........................ 297/301.1 |
| 3,944,280 | A |   | 3/1976 | Keeler | |
| 4,498,702 | A |   | 2/1985 | Raftery | |
| 4,595,235 | A | * | 6/1986 | Leib | ............................... 297/294 |
| 4,618,185 | A | * | 10/1986 | Kaufman | ........................ 297/285 |
| 4,640,548 | A | * | 2/1987 | Desanta | ...................... 297/300.3 |
| 4,709,962 | A | * | 12/1987 | Steinmann | .................. 297/300.3 |
| 4,938,530 | A | * | 7/1990 | Snyder et al. | .................. 297/287 |
| 5,338,094 | A | * | 8/1994 | Perry | .......................... 297/411.4 |
| 5,342,112 | A |   | 8/1994 | Padovan | |
| 5,575,534 | A | * | 11/1996 | Yu | .............................. 297/452.21 |
| 5,823,626 | A |   | 10/1998 | Haas | |
| 6,003,942 | A | * | 12/1999 | Haas | .......................... 297/300.5 |
| 6,050,642 | A |   | 4/2000 | Erb | |
| 6,056,361 | A | * | 5/2000 | Cvek | .......................... 297/300.2 |

(Continued)

FOREIGN PATENT DOCUMENTS

| EP | 0130229 B1 | 6/1989 |
|---|---|---|
| EP | 2039268 A1 | 3/2009 |

*Primary Examiner* — Brodie Follman
*Assistant Examiner* — Brian Cassidy
(74) *Attorney, Agent, or Firm* — St. Onge Steward Johnston & Reens LLC

(57) ABSTRACT

A chair with a seating surface and a link with two ends connected to the seating surface. A frame with two supporting portions connected to the link and the frame can displace against a bias to allow one of the two supporting portions to move, allowing the seating surface to tilt. A flexible front is attached to a front member on the frame, the flexible front bends when the seating surface tilts. The link rotates when the supporting portions displace. The supporting portions are round and pass through round holes in the link, allowing the supporting portions to rotate within the link when the seating surface tilts. A stop connected to the seating surface and a stop connected to the frame limits the maximum tilt angle of the seating surface.

8 Claims, 9 Drawing Sheets

(56) References Cited

U.S. PATENT DOCUMENTS

| | | |
|---|---|---|
| 6,168,233 B1 | 1/2001 | Markus |
| 6,679,551 B2 * | 1/2004 | Ware et al. ............ 297/239 |
| 6,820,934 B2 | 11/2004 | Ware et al. |
| D503,300 S | 3/2005 | Olson |
| 6,983,997 B2 | 1/2006 | Wilkerson et al. |
| 7,073,864 B2 | 7/2006 | Olsen |
| 7,234,774 B2 | 6/2007 | Heidmann et al. |
| 7,296,853 B2 * | 11/2007 | Piretti ............ 297/239 |
| 7,334,842 B1 * | 2/2008 | Wu ............ 297/313 |
| D572,496 S | 7/2008 | Rizzi |
| 7,722,119 B1 | 5/2010 | Delmestri et al. |
| 7,766,426 B2 * | 8/2010 | Meidan ............ 297/303.4 |
| 2006/0202529 A1 | 9/2006 | Johnson et al. |
| 2010/0194160 A1 * | 8/2010 | Machael et al. ............ 297/239 |
| 2011/0140492 A1 | 6/2011 | Walsh |

* cited by examiner

RECLINING LOOP FRAME STACKING / SWIVEL CHAIR

FIELD OF THE INVENTION

The invention relates to chairs, more particularly, the invention relates to a reclining chair.

BACKGROUND OF THE INVENTION

It is often desired for comfort reasons that chairs can recline, and there are a number of known mechanisms for accomplishing this purpose. Some require a user input from a handle or lever to allow reclining and others use a number moving parts that result in an increased cost of manufacture, thus not all applications for chairs will provide a reclining action because of the increased cost of doing so. For example, stackable auditorium or event chairs may commonly be produced at a minimum price that results in an unsatisfactory comfort level.

The price of chairs can vary drastically based on the functionality and options provided, but a reclining option is often desirable. When cost is an issue as is usually the case with auditorium chairs, a reclining feature is often eliminated to reduce cost of the chair. A disadvantage to many known mechanisms is that they are generally complicated and require a number of moving parts and fasteners. It is therefore desirable to have a chair with a simple reclining action and mechanism that can be produced in a cost effective manner while providing increased comfort in relation to other available chairs.

It is further desired to provide a reclining swivel chair using a simplified and cost effective mechanism with enhanced tilting capabilities.

European Patent No. 0130229 to Chadwick discloses a one piece shell chair having a seat and a pivot frame. A support base and a frame member pivot with respect to a torsion bar, allowing the chair to recline.

European Patent No. 2039268 to Saez discloses a stackable chair having a frame, seat and a back, where the back has selectively located slot patterns or springs that allow for reclining.

U.S. Pat. No. 4,498,702 to Raftery discloses a seat element and a thigh support element flexibly connected by leaf springs, offering thigh support.

U.S. Pat. No. 6,050,642 to Erb discloses an adjustable chair having an arcuate contact support structure with two rollers spaced between the arcuate support structures. The rollers contact various support platforms, but are not affixed to the chair back or seat.

U.S. Pat. No. 6,168,233 to Markus discloses a reclinable seat using a torsion bar connected to the seat to allow for a reclining action.

U.S. Pat. No. 7,073,864 to Olsen discloses a stackable chair of substantially X shaped configuration having two bars capable of flexing movement relative to one another.

U.S. Pat. No. 7,722,119 to Delmestri discloses a chair with a tiltable seat.

It is therefore an object of the present invention to provide an improved mechanism for chairs that allows the seat to tilt or recline that overcomes the disadvantages of the prior art. Another object of the present invention is to provide an improved mechanism that allows stackable chairs to recline. It is yet another object of the invention to provide a cost effective mechanism that allows event chairs to be more comfortable. A further object of the present invention is to provide an improved swivel chair with a simplified tilting mechanism and enhanced tilting capabilities.

SUMMARY OF THE INVENTION

These and other objects are achieved by providing a chair with a seating surface and a link with two ends connected to the seating surface. A frame with two supporting portions is connected to the link and the frame can displace against a bias to allow one of the two supporting portions to move, which allows the seating surface to tilt. In one embodiment of the present invention the frame also has a front member and the seating surface has a front connected to the front member, the front section bends when the seating surface tilts. In yet another embodiment of the present invention, both supporting portions can displace against the bias, additionally, the two supporting portions can displace in an opposing direction. Further, the link may rotate when the supporting portions displace. The supporting portions may also be round and passing through round holes in the link, allowing the supporting portions to rotate within the link when the seating surface tilts.

In another embodiment of the present invention, a stop is connected to the seating surface. The stop may be a separate part attached to the seating surface or alternatively, the stop may be integrated into the link or the connection interface between the link and the supporting portions. The frame also has a stop, which like the stop of the seating surface may be a separately attached part or may be integrated into a portion of the frame, for example, the supporting portion of the frame may have a stop. The stop of the seating surface and the frame interact to limit the tilting of the seating surface. The stops can be oriented or shaped to prevent plastic deformation of the frame.

Other objects of the present invention are achieved by providing a chair with a seating surface having a first position. A link connected to the seating surface has two ends. A frame has two supporting portions respectively connected to the two ends of the link. The frame can displace against a bias to permit movement of one of the two supporting portions to allow tilting of the seating surface to a second position. The frame is resilient to return the seating surface to the first position. A stop can be connected to the seating surface. The stop may be a separate part attached to the seating surface or alternatively, the stop may be integrated into the link or the connection interface between the link and the supporting portions. The frame also has a stop, which like the stop of the seating surface may be a separately attached part or may be integrated into a portion of the frame, for example, the supporting portion of the frame may have a stop. The stop of the seating surface and the frame interact to limit the tilting of the seating surface. The stops can be oriented or shaped to prevent plastic deformation of the frame. One embodiment of the chair has a stop connected to the seating surface composed of an asymmetrical shaped hole in the link. The stop of the frame is composed of an elongated cross section of one of the supporting portions, for example a round bar welded to one side of the supporting portion. The elongated cross section can rotate within the asymmetrical shaped hole, however this rotation is limited to a predetermined angle due to the asymmetrical hole and the elongated cross section design.

Other objects of the present invention are achieved by providing a chair with a seating surface and two links connected to the seating surface. A frame with two substantially parallel supporting portions are and each connected to one end of each of the links. The frame can displace against a bias to permit movement of one of the two supporting portions to allow tilting of the seating surface. In one embodiment of the present invention, the chair can also have a base with wheels where the frame is connected to the base. The base can also allow for swivel and/or height adjustment of the chair. The link may also have an inner portion and an outer portion where the supporting portions are inserted into holes in the inner portion and the inner portion is secured to the outer portion. A stop can be connected to the seating surface. The stop may be a separate part attached to the seating surface or alternatively, the stop may be integrated into the link or the connection interface between the link and the supporting portions. The frame also has a stop, which like the stop of the seating surface may be a separately attached part or may be integrated into a portion of the frame, for example, the supporting portion of the frame may have a stop. The stop of the seating surface and the frame interact to limit the tilting of the seating surface. The stops can be oriented or shaped to prevent plastic deformation of the frame. One embodiment of the chair has a stop connected to the seating surface composed of an asymmetrical shaped hole in the link. The stop of the frame is composed of an elongated cross section of one of the supporting portions, for example a round bar welded to one side of the supporting portion. The elongated cross section can rotate within the asymmetrical shaped hole, however this rotation is limited to a predetermined angle due to the asymmetrical hole and the elongated cross section design.

The frame can also have four portions. A first portion is connected to a first end of the first one of the supporting portions. A second portion of the frame is connected to a second end of the first one of the supporting portions. A third portion of the frame is connected to a first end of the second one of the supporting portions. A fourth portion of the frame is connected to a second end of the second one of the supporting portions. Each of the four supporting portions are adapted to bend to allow each end of said two supporting portions to displace. For example, to allow the seat to tilt from side to side as well as front to back.

DETAILED DESCRIPTION OF THE INVENTION

Figure 1:
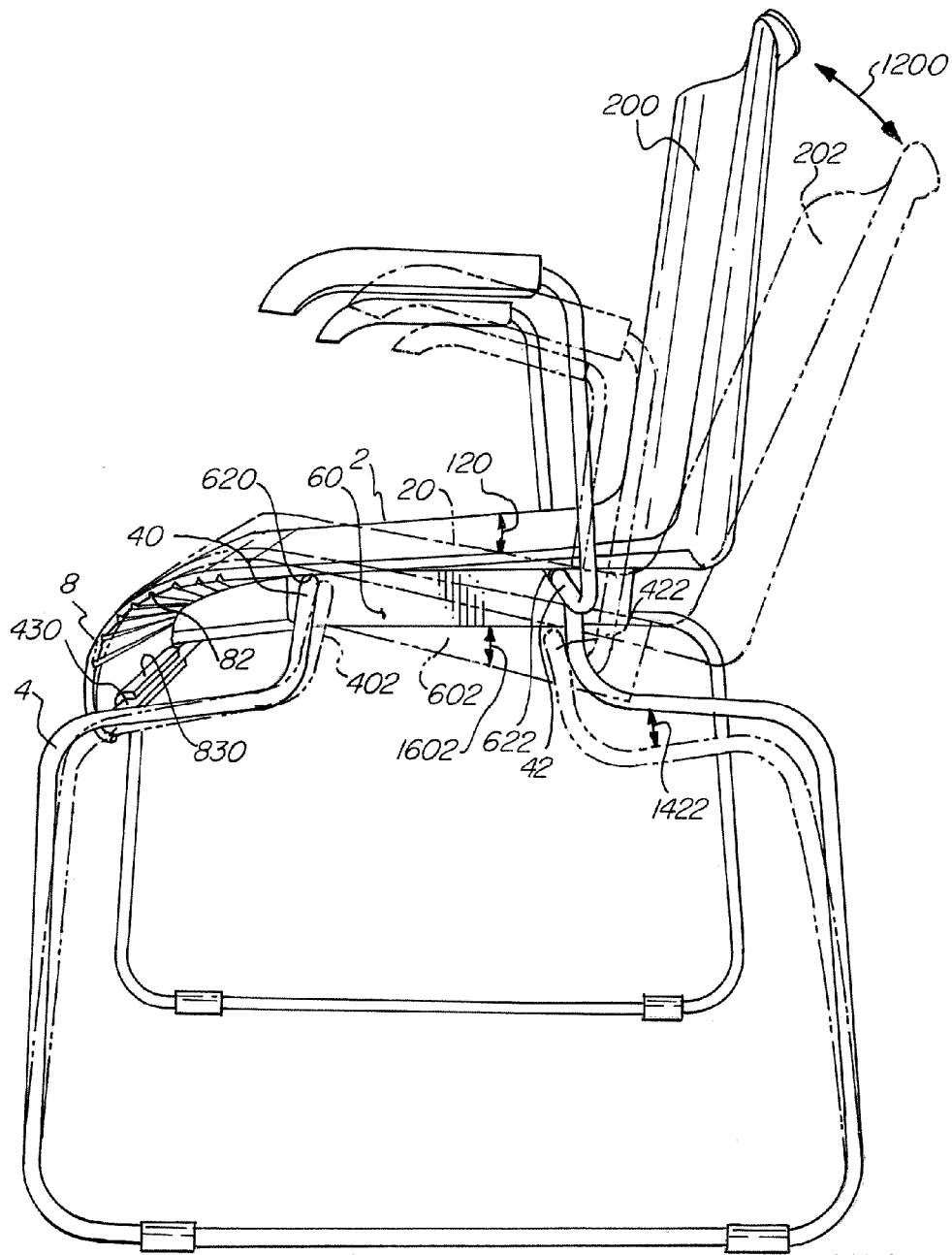
FIG. 1 is a side view of the chair showing a neutral and reclined position.

FIG. 1 shows a chair with a seating surface 2 that can tilt to a second position 20. The seating surface 2 is connected to a link 60. The link has two ends 620/622 with two supporting portions 40/42 of a frame 4 connected to either end 620/622 of the link. The link can rotate to a second position 602 as shown by arrow 1602. Because the link is connected to the seating surface 2, when the link rotates to a second position 602, the seating surface tilts to a second position 20 as shown by arrow 120. The link provides a constant distance between the first and second supporting portions. The link may be integrated with of the seating surface or it may be a separate part that is connected to the seating surface. The seating surface may also be connected to a back 200 that tilts with the seating surface 2 to a second position 202. The frame 4 can bend, which allows the supporting portions to displace to another position 422/402 and the link to rotate, which tilts the seat. Displacement of the supporting portion 42 to position 422 is shown by arrow 1422. Rotation of the link is shown by arrow 1602. The frame is made of a resilient material that can return the seating surface from the tilted position 20 to a neutral position. The front 8 of the seating surface is connected to a front bar 430 of the frame. The front 8 is flexible to allow for the tilting action of the seating surface. In the embodiment shown in FIG. 1, the flexibility of the front 8 is achieved by a series of channels or grooves 82 in the material that provide for increased flexibility. In alternate embodiments, the front can be made of a different material that may be more flexible than other parts of the seating surface. The front 8 is attached to the front bar 430, for example with a clip portion 830. Although shown as round in the drawings, the supporting portions may be of different shapes and may be secured to the link where the supporting portions also bend when the frame bends and the link rotates.

Figure 2:
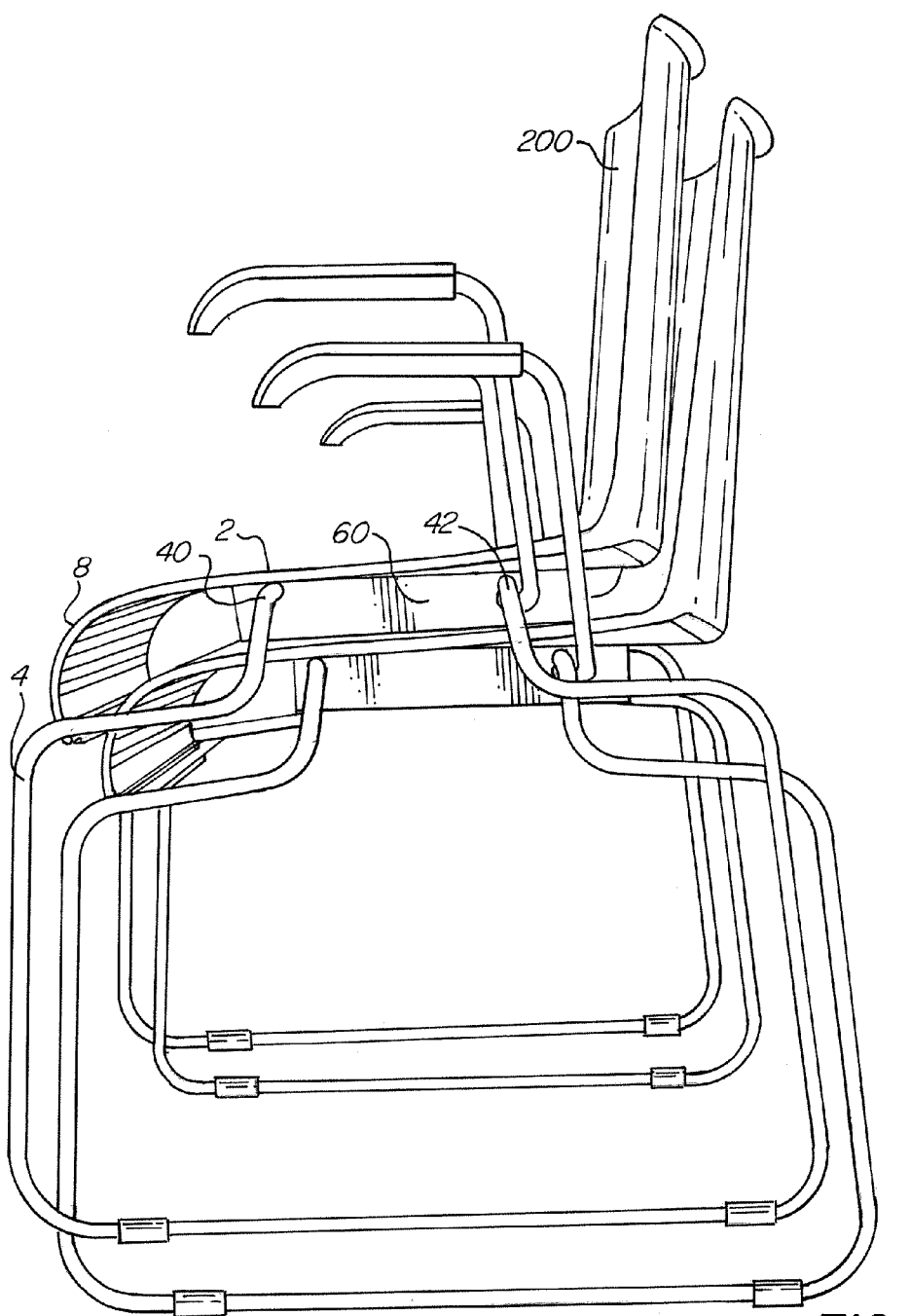
FIG. 2 is a side view of two of the chair of FIG. 1

FIG. 2 shows two of the chairs of FIG. 1, both in a neutral position and stacked upon each other. As shown in the figure, link 60 is in a generally horizontal position when no tilting forces are applied to the chair or frame to recline the chair. The frame 4 is designed to stack on top of another chair for easier storage and transport.

Figure 3:
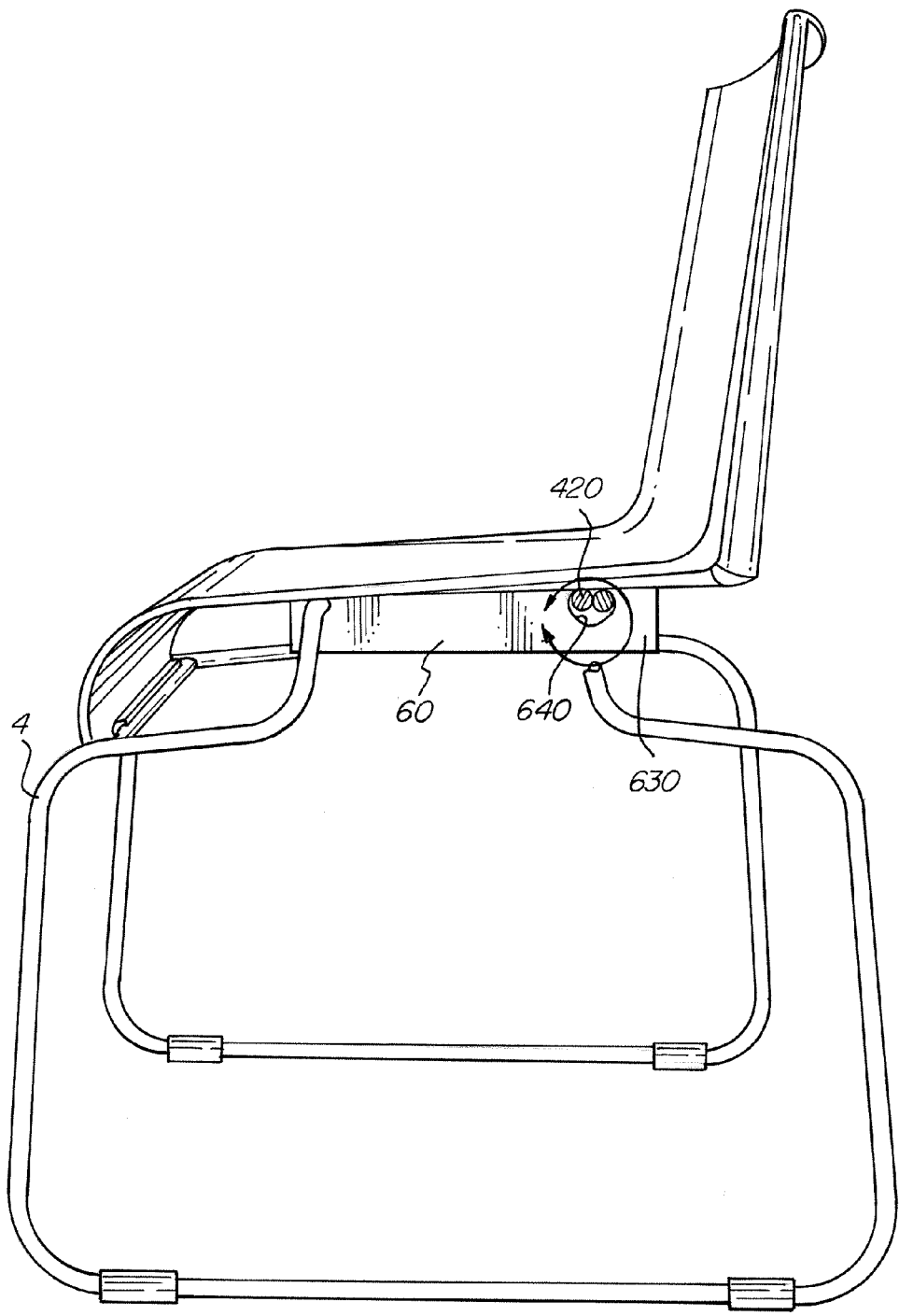
FIG. 3 is a side cutaway view of the chair of FIG. 1 showing one embodiment of the frame.

FIG. 3 shows an alternate embodiment of the frame of FIG. 1. A cutaway view is shown at one end of the link. The rear end of the link 630 has an asymmetrical hole 640. The supporting portion 420 has an elongated shape that can rotate within the asymmetrical hole 640. The combination of an asymmetrical hole 640 and the elongated shape 420 of the supporting portion provides a stop that prevents the chair from tilting beyond a predetermined angle or position.

Figure 4A:
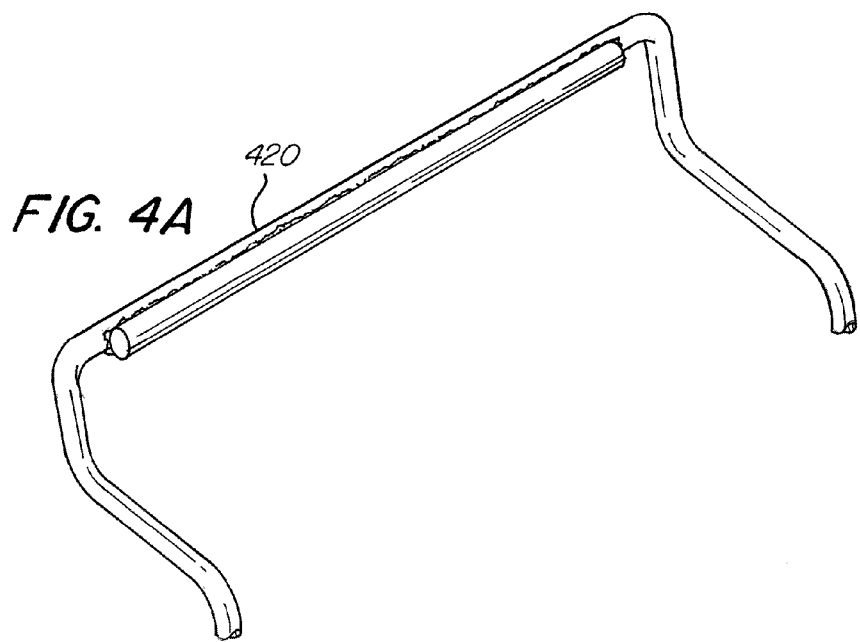
FIGS. 4A, 4B and 4C show detail views of the cutaway shown in FIG. 3.
Figure 4B:
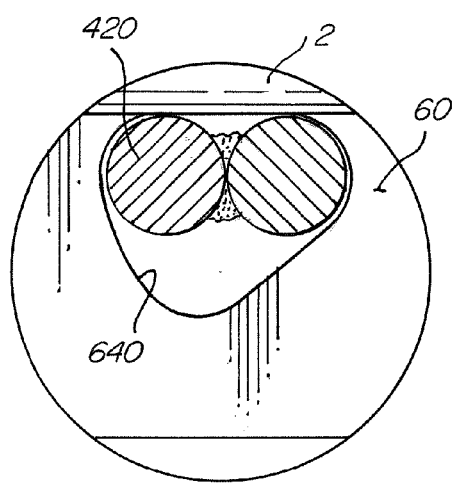
Figure 4C:
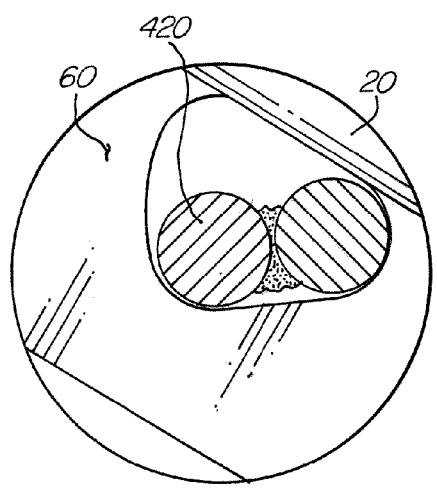

FIG. 4A shows a perspective view of the supporting portion 420 with an elongated shape. FIG. 4B shows the hole 640 with an asymmetrical shape and the supporting portion 420 in a first position with the seating surface 2 in a neutral or horizontal position. The asymmetrical hole 640 as shown in the drawings has two substantially straight sections and one curved section where the straight sections can interact with the elongated cross section of the bar at either end of the rotation, and the curved section allows for movement of the elongated section within the hole so that the link can rotate between the predetermined limits of rotation. As shown in the figures, the elongated cross section may be formed by welding a round bar to the supporting portion. Although a round bar is shown, other shapes could work as would be apparent to one of skill in the art. When the seating surface is tilted to a second position 20, the link 60 rotates as the supporting portion displaces. As shown in FIG. 4C, the rotation of the link around the supporting portion 420 is limited by the combination of the elongated shape and the asymmetrical hole. This prevents the seating surface from tilting too far. This further prevents damage to the frame that could be associated with tilting the seating surface too far. For example, plastic deformation of the frame could result from excessive tilting, thus the stop can be oriented so that the frame will not plastically deform at the maximum tilt position. Such feature allows the chair to continue to return to the original, neutral or horizontal position when the chair is not used or the person sitting on the chair does not wish to tilt the seating surface.

Figure 5:
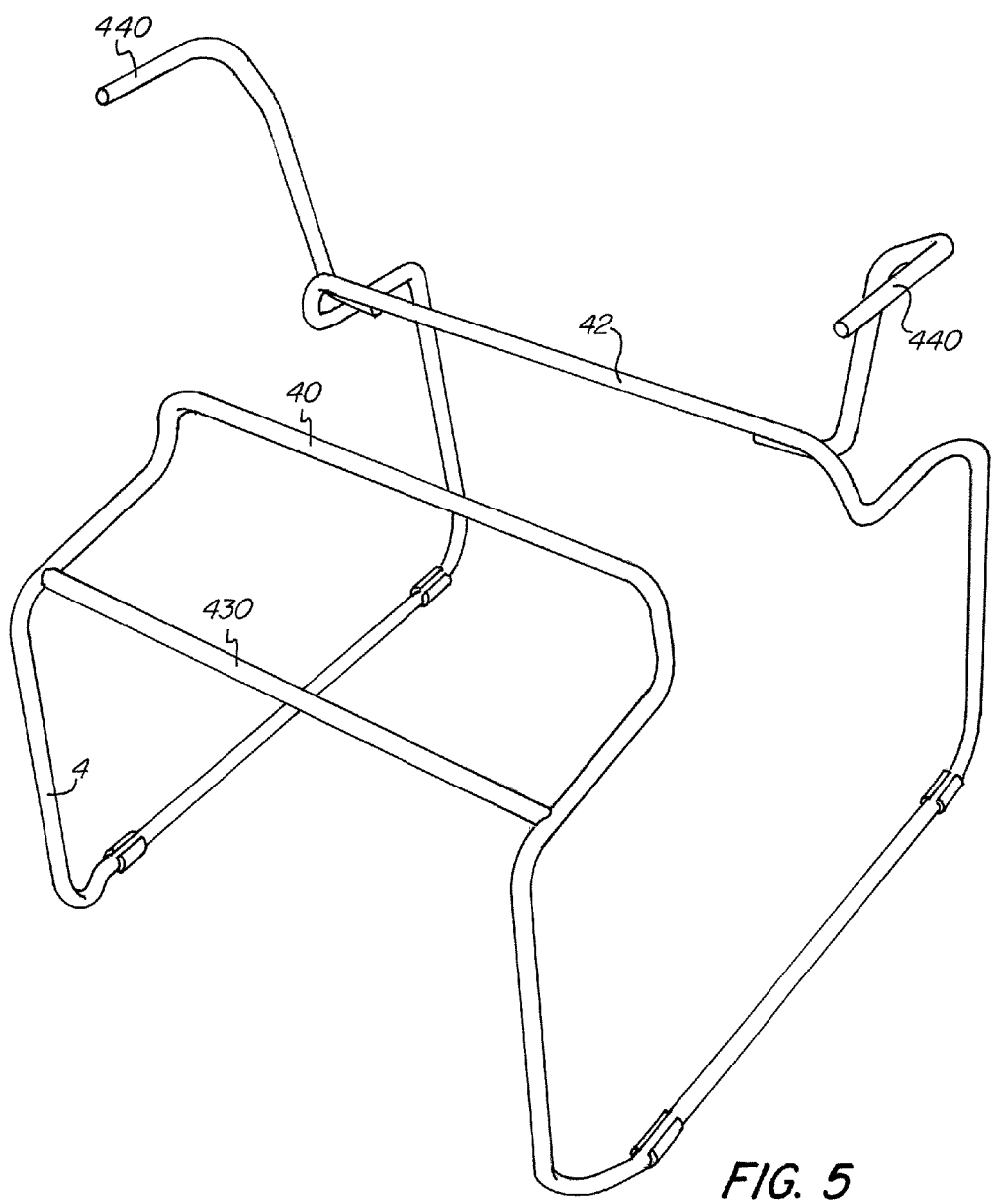
FIG. 5 shows a perspective view of the frame of FIG. 1.

FIG. 5 shows a frame 4 without a seating surface or link attached to it. The supporting portions 40 and 42 as shown are substantially parallel to each other. The supporting portions and frame may be formed from a round bar with a number of bends that form the frame. The front bar 430 is attached to the front of the frame, typically by welding the front bar 430 to the frame 4. Arms 440 are attached to the frame at one of the supporting portions. As shown, the arms 440 are attached to the rear supporting portion 42. The arms may act as lever arms to allow the user to input a force that displaces the supporting portion 42 to allow the link to rotate and the seating surface to tilt.

Figure 6:
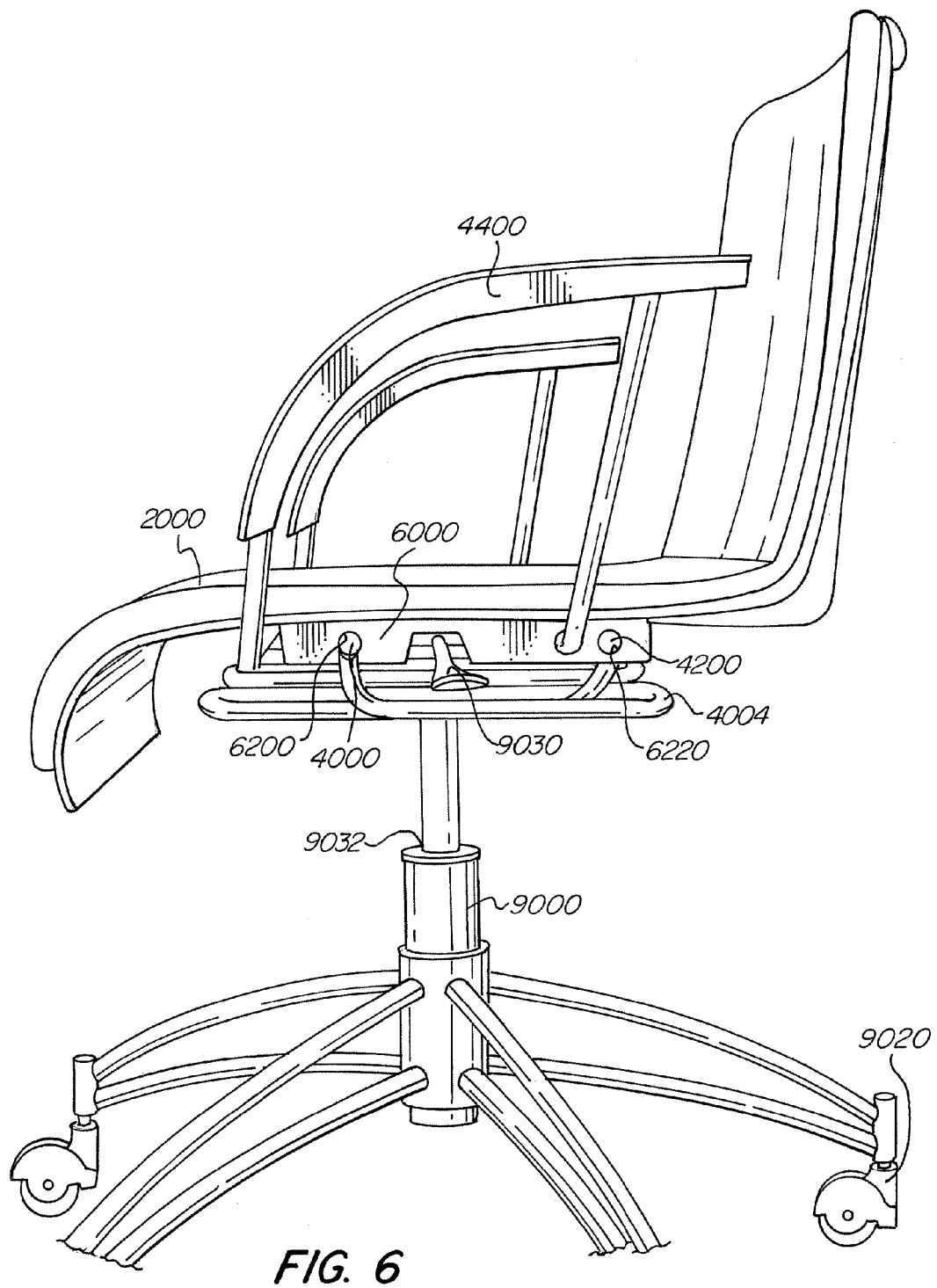
FIG. 6 shows a side view of an alternate embodiment of the chair shown in FIG. 1.

FIG. 6 shows an alternate embodiment of the chair of FIG. 1. The seating surface 2000 is attached to links 6000 and 6002 each with first and second ends 6200 and 6220 (ends only shown for one of the links). There may alternatively be one link with two ends connected to the seating surface, however two links are shown in the FIG. 6. The ends of the link are attached to supporting portions 4000 and 4200 of a frame 4004. The frame can bend such that the supporting portions 4000 and 4200 displace to tilt the seat. For example, to recline the seat, supporting portion 4200 would displace down and supporting portion 4000 would displace up. The seat can also tilt forward where supporting portion 4200 would displace up and supporting portion 4000 would displace down. The forward tilting motion can be helpful to reduce pressure on users legs. The displacement of the supporting portions rotates the link. As shown, the supporting portions are round and the link has round holes. When the link rotates, the supporting portions rotate within the holes. The frame 4004 is connected to a base 9000 with wheels 9020. The base 9000 can swivel and a piston 9032 can be activated by lever 9030 to change the height of the seating surface 2000. Arms 4400 are connected to the link 6000. The arms may alternately be connected to the frame 4004 or supporting portions 4200.

Figure 7A:
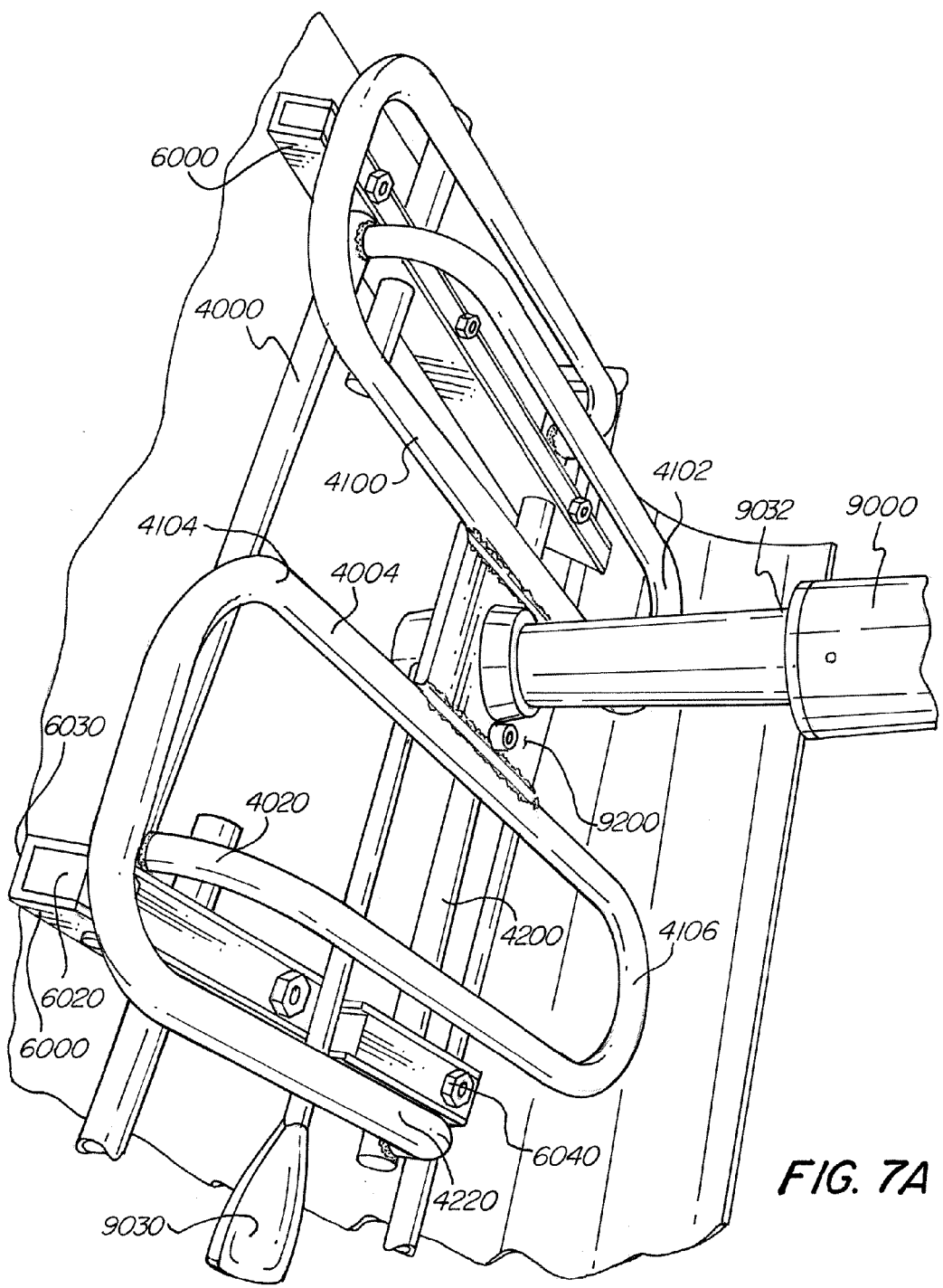
FIG. 7A shows a perspective view of the underside of the chair shown in FIG. 6.
Figure 7B:
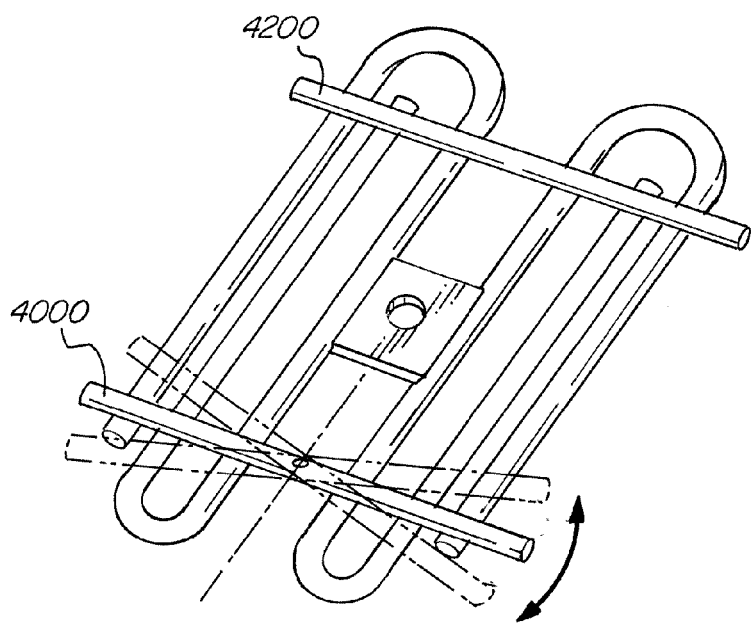
FIG. 7B shows a top perspective view of the frame of FIG. 7A
Figure 7C:
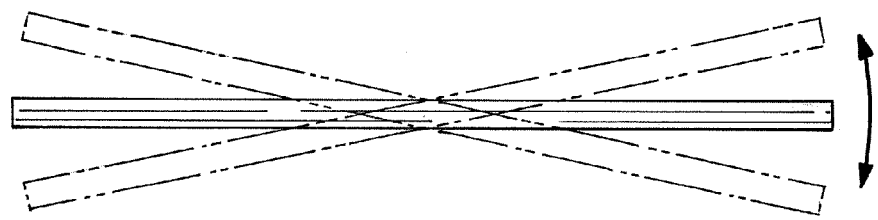
FIG. 7C shows a front view of one of the parts shown in FIGS. 7A and 7B

FIG. 7A shows a bottom perspective view of the chair shown in FIG. 6. Supporting portions 4000 and 4200 of the frame 4004 extend between the two links 6000 and 6002. Each supporting portion has two ends, with one end connected to link 6000 and the second end connected to link 6002. The frame as shown in FIG. 7 includes a first section 4100 extending in one direction from one side of the plate and connecting to the supporting portion 4200 at a first end of the supporting portion. A second section 4102 on the one side of the plate 9200 extends in an opposite direction to connect with supporting portion 4000 at a first end of the supporting portion. On the second side of the plate 9200, a third section 4104 extends and connects with supporting portion 4200 at the second end. A fourth section extends and connects with supporting portion 4000 at the second end. The connection of each section of the frame to one end of the two supporting portions allows the seating surface to tilt both forward and backwards as well tilt from side to side. FIGS. 7b and 7c shown the tilting from side to side discussed above. FIGS. 7b and 7c show the tilting of one of the two supports, however it should be appreciated that the tilting of the supports causes the corresponding sections of the frame to bend, and both of the supports 4000 and 4200 may tilt in the manner shown in FIGS. 7b and 7c. The distance between the supporting portions may be changed depending on the desired stability. For example, if the links are spaced close together and the frame is more narrow, the seating surface will be less stable and may increase core development or usage of the individual sitting on the chair. A more stable chair is created by moving the links further apart. The same can be done with the spacing of the supporting portions. If the supporting portions are closer together, the seating surface can recline and tilt forward more easily, whereas if the supporting portions are farther apart, the chair will not tilt as easily. The frame 4004 is connected to a plate 9200 and the plate is connected to the base 9000. The piston 9032 is activated by lever 9030 to raise and lower the seating surface. The link 6000 as shown includes an outer portion 6030 and an inner portion 6020 that are secured together by bolts 6040. The inner and outer portions are used during assembly so that the inner portion 6020 may be mounted on the supporting portions 4000 and 4200 by holes in the inner portion. The outer portion is then placed over the inner portion to secure the seating surface to the supporting portions of the frame. Also shown is one portion of the frame 4220 that connects to the supporting portion 4200 at the outside of the link and a second portion 4020 of the frame that connects to the inside of the link. Such connection keeps the link and the seating surface centered over the base 9000.

Figure 8:
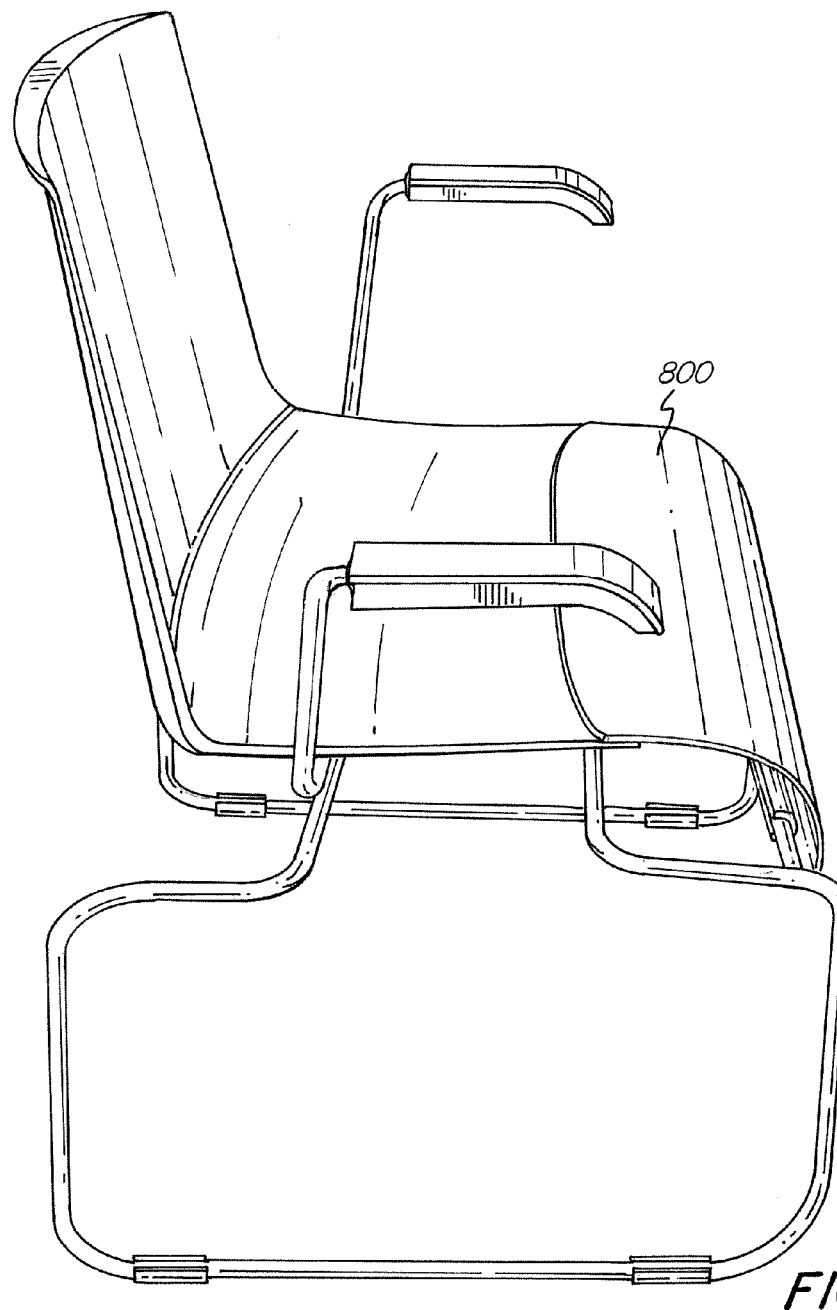
FIG. 8 is a side perspective view of an alternate embodiment of the chair of FIG. 1.

FIG. 8 shows the chair of FIG. 1 with a front portion 800 that is a separately attached part or a different material than the seating surface. A different material may be used to provide flexibility of the front without the need for the channels that are shown in FIG. 1.

What is claimed is:

1. A chair comprising:
   a seating surface having a first position;
   a link having first and second ends and connected to said seating surface; and
   a frame having first and second supporting portions respectively connected to the first and second ends of said link each of said first and second supporting portions having a longitudinal axis;
   said frame adapted to displace against a bias in a resilient material of the frame to thereby permit movement of each of said first and second supporting portions and allow tilting of said seating surface about an axis of rotation parallel to the longitudinal axes of said first and second supporting portions to a second position, said frame resilient to return said seating surface to said first position;
   further comprising a stop connected to said seating surface; and
   said frame having a stopping portion,
   said stop and said stopping portion adapted to interact to limit rotation of said link about at least one of said first and second supporting portions to thereby limit the tilting of the seating, surface, wherein said stop is an asymmetrical shaped hole and said supporting portion has an elongated cross section to form said stopping portion.

2. The chair of claim 1 wherein said chair can be stacked.

3. The chair of claim 1 wherein said stop is part of said link.

4. The chair of claim 2 wherein said stop prevents plastic deformation of said frame.

5. The chair according to claim 3, wherein:
   said seating surface includes a rear portion and a front portion;
   said link being connected to the rear portion of said seating surface;
   said frame including a front support forward of said link; and
   the front portion of said seating surface attached to a front edge of the rear portion of said seating surface at one end and to said front support at another end and made of a first material more flexible than a second material of the rear portion of the seating surface.

6. The chair according to claim 5, wherein, upon tilting of said seating surface, the front portion of said seating surface bends.

7. The chair according to claim 6, wherein, the first material extends across an entire cross section of the front portion of said seating surface.

8. The chair according to claim 7, wherein the first material extends across an entire width of the front portion of said seating surface.

\* \* \* \* \*